United States Patent [19]

Steffan

[11] Patent Number: 4,784,346

[45] Date of Patent: Nov. 15, 1988

[54] MOTORIZED FISHING REEL

[76] Inventor: Walter J. Steffan, P.O. Box 116, Tygh Valley, Oreg. 97063

[21] Appl. No.: 70,203

[22] Filed: Jul. 6, 1987

[51] Int. Cl.$^4$ .......................................... A01K 89/017
[52] U.S. Cl. .................... 242/84.1 A; 43/21; 74/425; 74/849
[58] Field of Search ............ 242/84.1 A, 84.1 R, 242/211–221; 43/21; 200/338, 68.2, 153 T, 160, 153 LB; 310/83, 91; 74/425, 849

[56] References Cited

U.S. PATENT DOCUMENTS

| | | | |
|---|---|---|---|
| 1,062,488 | 5/1913 | McCluer et al. | 242/84.1 A |
| 1,327,129 | 1/1920 | Wolff | 74/849 X |
| 1,580,986 | 4/1926 | Aberson | 242/84.5 R |
| 1,681,404 | 8/1928 | Hardman | 74/849 |
| 2,262,637 | 11/1941 | Fanshier | 242/84.1 A |
| 2,714,271 | 8/1955 | Stratton | 43/21 |
| 2,896,875 | 7/1959 | Reed et al. | 242/84.1 A |
| 2,972,663 | 2/1961 | Zanichkowski et al. | 200/68.2 X |
| 3,030,046 | 4/1962 | Markoff-Moghadam | 242/84.53 |
| 3,116,892 | 1/1964 | Pickard | 242/84.1 A |
| 3,215,359 | 11/1965 | Sanders | 242/84.1 A |
| 3,246,859 | 4/1966 | Martin | 242/84.1 A X |
| 3,405,473 | 10/1968 | Boussageon | 43/21 |
| 3,675,870 | 7/1972 | Ride et al. | 242/84.1 A |
| 4,021,003 | 5/1977 | Watkins | 242/84.1 A |
| 4,515,324 | 5/1985 | Barton | 242/84.1 A |
| 4,598,878 | 7/1986 | Steffan | 242/84.1 A |

Primary Examiner—Stuart S. Levy
Assistant Examiner—Joseph J. Hail, III
Attorney, Agent, or Firm—Eugene M. Eckelman

[57] ABSTRACT

A fishing reel body with a fish line spool has an electric motor assembly mounted thereon having a circuit operated by a control level. This lever extends between opposite ends of the reel body and has a finger engaging portion extending outwardly for manual engagement by a fisherman. The lever has a first position wherein the finger engaging portion extends outwardly radially from the fish line spool. This first position comprises a deenergized condition of the motor. The lever has a second position wherein the finger engaging portion is angled upwardly relative to its first position. This second position comprises a locked-on energized condition of the motor. The lever also has a third position wherein the finger engaging portion is angled downwardly relative to the first position. This third position comprises a manually held energized condition of the motor. A switch in the circuit and the motor assembly are arranged such that the drive output gear of the motor and a drive receiving gear of the fish line spool are engaged prior to closing of the switch.

10 Claims, 2 Drawing Sheets

MOTORIZED FISHING REEL

BACKGROUND OF THE INVENTION

This invention relates to new and useful fishing reels and particularly relates to a motorized fishing reel.

In one form of fishing, the fisherman casts out away from the bank or a boat and allows the baited hook to settle to the bottom either in a fixed position or one which drifts with the current. These procedures usually require frequent casting and considerable reeling in of the line to make another cast. This frequent manual reeling in of the line is burdensome, tiring, and time consuming. Also, when a fish is hooked, it is usually desirable to keep slack out of the line, and with manually operable fishing reels, it is difficult to keep the line tight on the hooked fish since the operator cannot handle the pole and at the same time respond and reel fast enough. In deep water fishing, the baited hook is allowed to sink in the water under the influence of a heavy weight. This heavy tackle also makes reeling in of the line burdensome, tiring, and time consuming.

SUMMARY OF THE INVENTION

According to the present invention and forming a primary objective thereof, a fishing reel is provided having a motorized structure that greatly speeds up a return of the line to the reel and also makes it much easier for the fisherman to bring in the line at the end of a cast or drift and also to keep slack out of the line when a fish has been hooked. The motorized fishing reel also makes it easy to lift a hook and weight when fishing in deep water.

Another object of the invention is to provide a motorized fishing reel that is compact in structure and convenient to operate.

Another object of the invention is to provide a motorized fishing reel that employs an operating lever which is conveniently located and shaped for easy operation by the fisherman without interferring with other functions of the reel and which is associated with control means that provide a motor deenergized position of the lever, a locked-on motor energized position, and a manually held motor energized condition.

Still another object of the invention is to provide a motorized fishing reel which in its manufacture is capable of using basic conventional reel parts and also is capable of converting conventional reels to a powered unit.

In carrying out the objectives of the invention, an electric motor is combined with a reel body having a spool shaft journaled thereon, a fish line spool mounted on the shaft, and drive receiving gears on the reel body operably connected to the shaft. Pivot means pivotally mount the motor on the reel body for engagement and disengagement of gears, and a spring urges the motor pivotally in one direction. A switch is operably engageable by the motor in its pivotal movement and controls on-off operation thereof. A pivotal cam is mounted on the reel body and operably engages the motor assembly for pivoting the latter against the action of the spring. A lever on the reel body is located for hand engagement by the fisherman. This lever extends integrally from the cam and is arranged to pivotally move the cam to at least three operable positions, the first of such positions pivoting the motor to a deenergized condition and the second and third of the cam positions pivoting the motor to selected motor energized conditions, whereby the fisherman can control operation of the reel by hand adjustment of the lever. The second cam position provides a locked-on motor energized condition and the third cam position provides a manually held energized motor condition. The motor is supported on a bracket for its pivotal movement, and adjustment and stop means are associated therewith for providing selective operation. The switch and motor are dimensioned and arranged such that drive output gear of the motor and the drive receiving gear are engaged prior to closing of the switch in the movement of the motor from its first to either of its second or third positions.

The invention will be better understood and additional objects and advantages will become apparent from the following description taken in connection with the accompanying drawings.

DETAILED DESCRIPTION OF A PREFERRED EMBODIMENT

Figure 1:
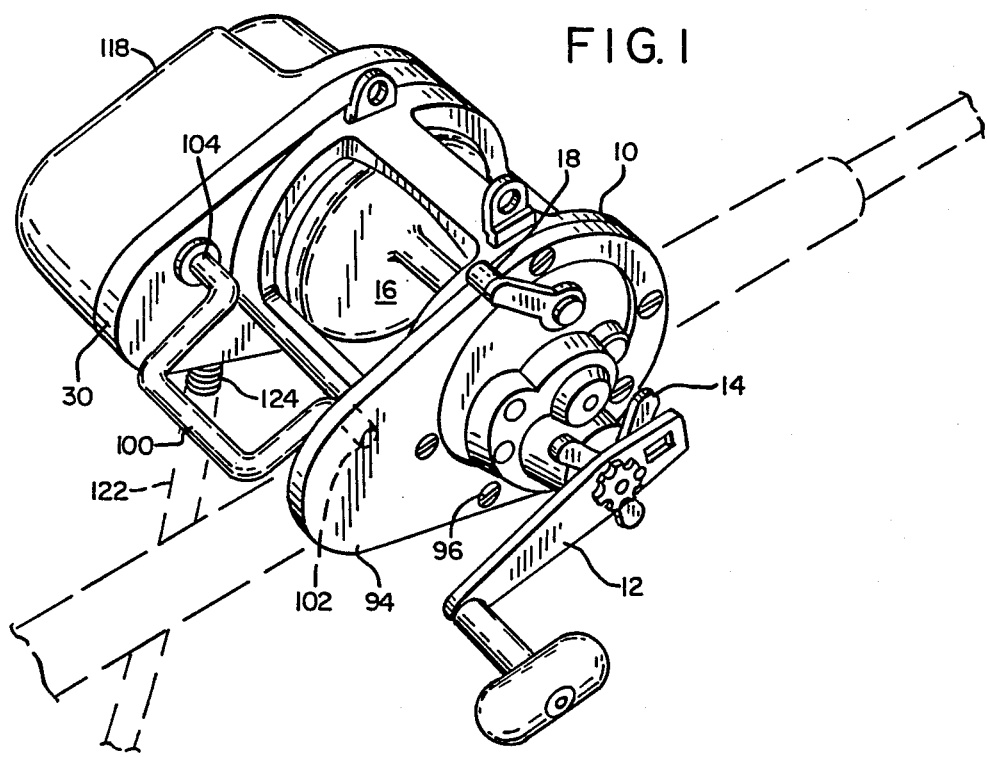
FIG. 1 is a rear perspective view of a fishing reel embodying features of the present invention.
Figure 2:
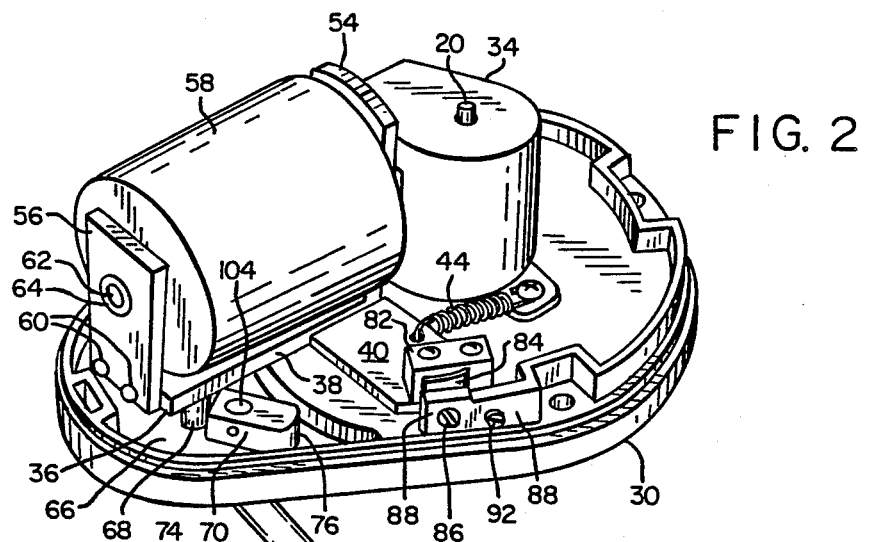
FIG. 2 is a perspective view of motor drive and operating structure, such structure forming a part of the left side of the reel of FIG. 1 and having a cover portion removed to show internal structure.
Figure 3:
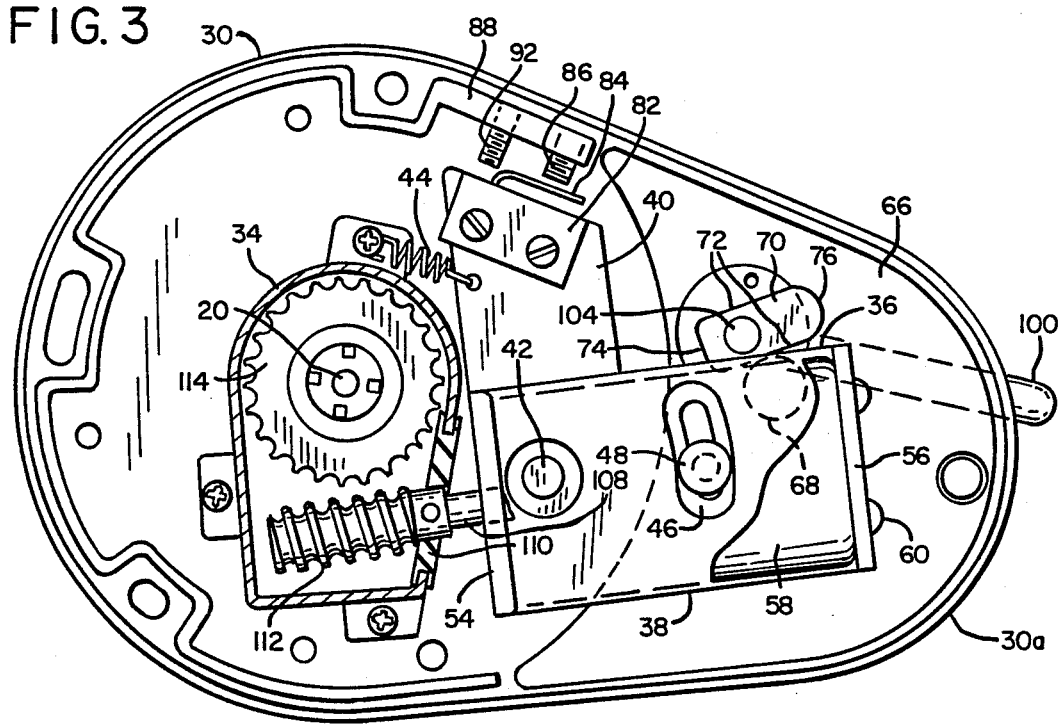
FIG. 3 is an enlarged face view of the motor drive and operating structure, this view showing disengaged condition of drive gears and a deenergized condition of the motor.

With particular reference first to FIG. 1, the numeral 10 designates a reel body having the usual reel handle 12, star wheel drag control 14, fish line spool 16, and release lever 18 which in one position provides a drive connection between the handle and the spool and in another position allows freewheeling of the spool. The spool 16 is on an axial shaft 20, not shown in FIG. 1 but visible in FIGS. 3 and 4, wherein the end thereof opposite from the handle end projects from the other end. The reel has suitable foot means, not shown for securement to a fish pole.

The end of the reel opposite from the handle has an end or base plate 30 suitably secured to the reel body. This end plate is provided with a grease box 34 into which the spool shaft extends. The outwardly directed surface of end plate 30 supports a motor bracket 36 which includes a a plate-like main body portion 38 and a lateral extension 40. Motor bracket 36 has a pivot connection 42 to the end plate 30, such pivot being located at the body portion of the bracket in laterally spaced relation from the extension 40 and adjacent the inner end of the bracket. A tension spring 44 is connected between the extension portion 40 of the motor bracket and a forward portion of end plate 30 to urge the motor bracket counterclockwise as viewed in FIGS. 3 and 4. An arcuate slot 46 is provided in the motor bracket and contains a limit pin 48 projecting thereinto which is integral with the end plate 30. Such pin and slot limit pivot movement of the motor bracket in both directions.

The motor bracket 36 has upstanding front and rear walls 54 and 56, respectively, for supporting an electric motor 58 thereon. Front wall 54 preferably is formed integrally with the motor bracket and the rear wall 56 is detachably connected to this bracket by screws 60 at the bottom. The motor includes end bosses 62 having fitted engagement in suitable apertures 64 in the walls 54 and 56 of the motor bracket.

End plate 32 has a well portion or depression 66 at its rearward end, and motor bracket 36 has a depending cam follower 68 integral therewith and projecting into this well portion 66. A cam member 70 in the well portion 66 is pivotally attached to the plate 30 adjacent the cam follower. This cam member is somewhat rectangular, having straight side surfaces 72 and opposite end surfaces 74 and 76. End surface 74 is substantially flat and extends approximately at right angles to the side surfaces 72. End surface 76 is rounded. As will be more apparent hereinafter, cam member 70 will remain in an overcenter locked position when its flat end surface 74 engages the cam follower 68 but such is not the case when the rounded end surface 76 engages the cam follower since it has to be held in such position.

Secured integrally to the lateral extension 40 of the motor bracket is a microswitch 82 having its switch lever 84 directed for abutment with an adjustable stop pin 86 threadedly supported in a projection 88 forming an integral part of the end plate 30. Axial adjustment of pin 86 in the projection 88 provides switch operation in a selected pivotal position of the motor bracket, to be described hereinafter A second adjusting pin 92 is mounted in the projection 88 and has end abutment against the end edge of the motor bracket extension 40. This latter pin provides a safety stop for the motor bracket to protect switch 82.

The rearward portion of the end plate 30, designated by the numeral 30a, tapers to a smaller dimension in a tearshape, and a tapered wall segment 94, FIG. 1, similar in shape to the smaller end 30a of the end wall 30 is mounted on the opposite or handle end of the reel body. Attachment of segment 94 is by suitable screws 96.

Journaled in the end wall 30 and segment 94 for disposition therebetween is a lever 100 which operates the cam member 70. This lever is U-shaped, having one end extension 102 for journaled support in the segment 94 and an opposite end portion 104 journaled in end wall 30 and secured integrally to the cam member 70. The U-shaped lever 100 operates on an axis substantially parallel with said spool shaft and has three positions, comprising a somewhat horizontal position directed toward the fisherman, FIG. 3, an up position shown in full lines in FIG. 4, and a down position shown in phantom lines in FIG. 4. These positions are associated with positions of the cam member 70 for providing off and on or deenergized and energized conditions of the motor, as will be more apparent hereinafter.

The output shaft 108 of the motor passes through a sealed slot 110 in a side wall of the grease box 34. This output shaft carries a worm gear 112 on an end portion thereof arranged for engagement with a pinion gear 114 on the spool shaft. As the motor bracket is pivoted by the cam member 70 or springs 44, these gears move into and out of meshing engagement.

In the particular relationship of the parts, and adjustments by pins 86 and 92, the switch will pull away from the actuating pin 86 when the motor bracket is allowed to pivot under the action of the spring to a counterclockwise position wherein the straight side portion of the cam member 70 is in engagement with the cam follower 68. Such comprises the position of the parts when the U-shaped lever 100 is directed substantially horizontally toward the fishermen, as viewed in FIG. 3. The gears are disengaged in this position. When the fisherman desires to switch the motor into a locked-on energized condition, wherein the lever 100 will stay in such position, he moves the lever upwardly which rotates the cam member 70 counterclockwise, FIG. 4, to engage the square end 74 with the cam follower 68. This movement of the lever is shown by arrow A in FIG. 4. Edge 74 comprises an overcenter position of the cam follower on the cam wherein the lever 100 will stay locked in its up position. As the cam member 70 rotates the motor assembly to this position, the microswitch 82 abuts against pin 86 and energizes the system.

Figure 4:
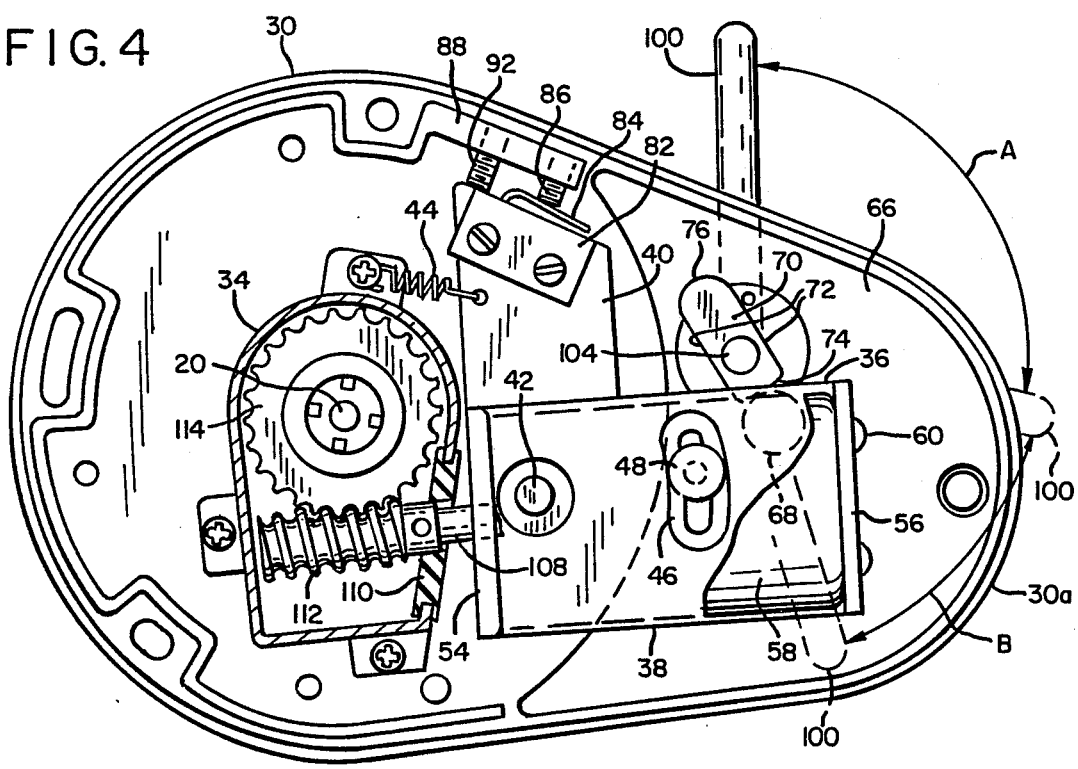
FIG. 4 is a view similar to FIG. 3 but showing the gears engaged and an energized condition of the motor.

In the third position of the lever, it is rotated downwardly to an angled position, as shown in phantom by arrow B in FIG. 4. This also rotates the motor assembly to close the switch, as in the up position, but since the cam member 70 rotates in a clockwise direction, its round end 76 engages the cam follower 68. This rounded end, when engaging the cam follower will not provide an overcenter or hold condition but rather the lever must be held by the fisherman.

The parts are arranged such that in all energized conditions of the motor, the gears are brought into mesh just prior to closing of the switch. More particularly, when the motor assembly is pivoted to the central or off condition of the motor, namely, engagement of the side 72 of the cam member 70 with the cam follower 68, the gears 112 and 114 are separated, FIG. 3. As the motor assembly pivots under the action of the cam member 70, however, the switch adjustment is such that the gears engage prior to closing of the switch in both of the motor energized conditions. Thus, there will be no grinding of the gears.

The stop pin 92 is adjusted so that the motor bracket engages it immediately after the switch is closed. Such pin thus prevents over pivoting of the motor bracket and consequently prevents switch damage. The limit pin 48 and arcuate slot 46 also serve to prevent overpivoting of the motor bracket and furthermore anchor the motor firmly on the bracket.

The end plate 30 and operating mechanism thereon are covered by a removable end cap 118.

Figure 5:
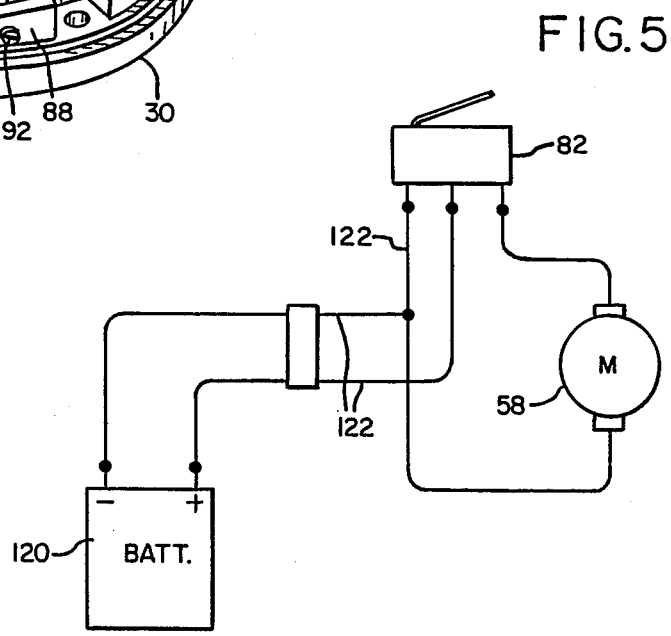
FIG. 5 is a schematic wiring diagram showing electrical circuitry in the invention.

Battery operation of the motor is accomplished in a well known manner. Such may comprise a battery 120, FIG. 5 conveniently positioned thereby or a battery supported on the person. With reference to FIG. 5, a preferred circuit to the motor provides dynamic braking. In such circuit, the switch 82 is a three position switch in the motor circuit 122 which when open causes a short circuit to the motor 54 through a circuit segment 122. Such short circuit causes the motor to act as a generator and stop immediately. Thus, there will not be any overrunning of the motor once the switch is opened. Plate 30 is equipped with a suitable fitting 124, FIG. 1 for circuit connection to the motor.

In the operation of the reel, casting or letting the line out is accomplished with the lever 100 in its intermediate position. Such comprises the engagement of the cam follower 68 with the long side of the cam member 70 and thus the spring 44 pivots the motor bracket to an off position of the switch. This pivoting movement also disengages the output worm gear on the motor shaft from the pinion gear in the grease box 34 and the fish line spool can thus rotate in freewheeling. If it is desired to reel the line in without thumb control, lever 100 is moved upwardly to the overcenter position of the cam member 70. If the fisherman desires to control specifically the motor operation and inward reeling of the line, he can press the lever downwardly as desired. For example, in playing a fish, the drag structure of the reel will apply the suitable tension on the line and the lever 100 can be depressed as necessary to take up slack in the line.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A motorized fishing reel comprising a reel body with opposite ends,
a spool shaft journaled on said reel body,
a fish line spool mounted on said shaft,
drive receiving gears on said reel body operably connected to said shaft,
electric motor means having an electric circuit therefor operably connected to said drive receiving gears,
pivot means pivotally mounting said motor means on said reel body,
spring means urging said motor means pivotally in one direction,
switch means in said electric circuit operably engageable by said motor means and controlling on-off operation of the motor means depending upon the pivot position of the latter,
pivotal cam means on said reel body operably engageable with said motor means for pivoting the latter against the action of said spring means,
and lever means on said reel body located for hand engagement by a fisherman,
said lever means extending integrally from said cam means and arranged to pivotally move said cam to at least three operable positions,
a first of said cam positions pivoting said motor means to a motor deenergized switch condition and second and third of said cam positions pivoting said motor means to selected motor energized switch conditions whereby the fisherman can control operation of said reel by hand adjustment of said lever means.

2. The motorized fishing reel of claim 1 wherein said second cam position provides a locked-on energized switch condition and said third cam position provides a manually held energized switch condition.

3. The motorized fishing reel of claim 1 wherein said motor means includes a cam follower engageable by said cam means.

4. The motorized fishing reel of claim 3 wherein said cam follower comprises a round projection.

5. The motorized fishing reel of claim 1 wherein said second cam position provides a locked-on energized switch condition and said third cam position provides a manually held energized switch condition, said lever means extending between the opposite ends of said reel body adjacent said fish line spool, said lever means in the first position of said cam means extending out in a direction approximately radially of said fish line spool, said lever in its second position being raised relative to its first position and in its third position being lowered relative to its first position.

6. The motorized fishing reel of claim 1 wherein said motor means includes a bracket to which a motor is secured, said bracket being pivotally connected to said reel body by said pivot means, a lateral extension on said bracket, said switch means being operably associated with said lateral extension for movement between its motor deenergized condition and its motor energized conditions.

7. The motorized fishing reel of claim 1 wherein said motor means includes a bracket to which, a motor is secured, said bracket being pivotalloy connected to said reel body by said pivot means, a lateral extension on said bracket, said switch means being secured to one of said lateral extension or reel body and including a spring pressed movable contact arm, a switch actuating abutment on the other of said lateral extension or reel body, the pivotal movement of said motor bracket and lateral extension providing relative movement between said switch means and its actuating abutment to cause said motor deenergized and energized conditions.

8. The motorized fishing reel of claim 7 including adjustment means providing selected switch operation dependent upon the pivotal position of said motor bracket.

9. The motorized fishing reel of claim 7 wherein said switch means is mounted on said motor bracket and said abutment is mounted on said reel body, adjustment means in said abutment providing selected switch operation dependent upon the pivotal position of said motor bracket, and stop means on said reel body limiting pivotal movement of said bracket.

10. The motorized fishing reel of claim 1 wherein said motor means includes a drive output gear, said drive output gear being disengaged from said drive receiving gears in said first of said cam positions and engaged with said driving receiving gears in said second and third cam positions, said switch means and said motor means being dimensioned and arranged such that said drive output gear and said drive receiving gear are engaged prior to closing of said switch means in the movement of said motor means from its first to either of its second or third positions.

* * * * *